(12) United States Patent
Karlsson

(10) Patent No.: US 10,988,029 B2
(45) Date of Patent: Apr. 27, 2021

(54) HAZARDOUS VOLTAGE INTERLOCK LOOP SYSTEM

(71) Applicant: VOLVO TRUCK CORPORATION, Gothenburg (SE)

(72) Inventor: Robert Karlsson, Kållekärr (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 248 days.

(21) Appl. No.: 16/330,261

(22) PCT Filed: Sep. 19, 2016

(86) PCT No.: PCT/EP2016/072184
§ 371 (c)(1),
(2) Date: Mar. 4, 2019

(87) PCT Pub. No.: WO2018/050254
PCT Pub. Date: Mar. 22, 2018

(65) Prior Publication Data
US 2019/0184835 A1    Jun. 20, 2019

(51) Int. Cl.
| *H02H 7/22* | (2006.01) |
| *H01H 83/02* | (2006.01) |
| *H02H 3/16* | (2006.01) |
| *B60L 3/04* | (2006.01) |
| *B60L 5/00* | (2006.01) |
| *H02H 3/05* | (2006.01) |

(52) U.S. Cl.
CPC ............ *B60L 3/04* (2013.01); *B60L 5/00* (2013.01); *H02H 3/05* (2013.01); *B60L 2200/36* (2013.01); *H01H 83/02* (2013.01); *H02H 3/16* (2013.01); *H02H 7/222* (2013.01)

(58) Field of Classification Search
CPC .......... H02H 3/16; H02H 7/222; H01H 83/02
USPC ................... 361/42, 93.1, 100, 102
See application file for complete search history.

(56) References Cited

U.S. PATENT DOCUMENTS 7,593,198 B2 * 9/2009 Brereton ................ H02H 7/222
361/2
8,587,912 B2 * 11/2013 Jezierski .................. H02H 5/04
361/93.1

(Continued)

FOREIGN PATENT DOCUMENTS

CN    204399046 U    6/2015
JP    2007286342 A    11/2007

*Primary Examiner* — Gary A Nash
(74) *Attorney, Agent, or Firm* — Venable LLP; Jeffri A. Kaminski

(57) ABSTRACT

The invention relates to a hazardous voltage interlock loop, HVIL, system (10), comprising a first HVIL circuit (12) being associated with a first high voltage bus (52) and a second HVIL circuit (14) being associated with a second high voltage bus (54), wherein the first and second high voltage buses (52, 54) are separated and not electrically connected to each other. The system further comprises a galvanically isolated relay (16) connected to the first and second HVIL circuits, wherein the galvanically isolated relay is configured to open the first HVIL circuit when no electrical current is flowing in at least a portion of the second HVIL circuit comprising the galvanically isolated relay. The present invention also relates to a vehicle comprising such a system. The present invention also relates to a method of operating a hazardous voltage interlock loop system.

10 Claims, 2 Drawing Sheets

(56) References Cited

U.S. PATENT DOCUMENTS

| | | | |
|---|---|---|---|
| 2010/0020452 A1* | 1/2010 | Gandolfi | H02H 3/16 |
| | | | 361/42 |
| 2011/0062798 A1 | 3/2011 | Tarchinski et al. | |
| 2013/0058011 A1 | 3/2013 | Jung et al. | |
| 2014/0062180 A1* | 3/2014 | Demmerle | B60L 3/00 |
| | | | 307/9.1 |
| 2015/0197153 A1* | 7/2015 | Luedtke | B60L 3/04 |
| | | | 324/503 |

* cited by examiner

HAZARDOUS VOLTAGE INTERLOCK LOOP SYSTEM

TECHNICAL FIELD

The invention relates to a hazardous voltage interlock loop, HVIL, system. The present invention also relates to a vehicle comprising such a system. The present invention also relates to a method of operating a hazardous voltage interlock loop system.

The invention can for example be applied in heavy-duty vehicles, such as trucks, buses and construction equipment. Although the invention will be described with respect to a truck, the invention is not restricted to this particular vehicle, but may also be used in other vehicles.

BACKGROUND

A hazardous voltage interlock loop is normally implemented to make sure all high voltage and current sources of a system are shut off in the event of an intrusion or a failure is detected somewhere in the system, for example opening a lid or unplugging a connector.

US2014/0062180, for example, discloses a high-voltage ("HV") system for a vehicle, which system includes a HV source providing HV power, a low-voltage source, a high-voltage interlock loop ("HVIL") switch, and at least one control module. The low voltage source provides a low-voltage power that is less than the HV power. The HVIL switch is in communication with the low-voltage source. The HVIL switch includes a reed relay and a magnetic element. US2014/0062180 further discloses an HVIL circuit that connects a plurality of HVIL switches to one another, where HVIL switch #1 corresponds to an HV power supply, HVIL switch #2 corresponds to a power inverter, and HVIL switch #3 corresponds to an AC motor.

Furthermore, US2011/0062798 discloses a vehicle including a high-voltage electrical system with a high-voltage electrical power source, a plurality of high voltage loads, and a plurality of functional high-voltage interlock (HVIL) circuits. Each of the high voltage loads is disposed within an enclosure, and each of the functional high-voltage interlock circuits is associated with one of the enclosures.

However, standards and/or legislation may cause systems like those disclosed in US2014/0062180 and US2011/0062798 to be inadequate for certain applications.

SUMMARY

An object of the invention is to provide an improved hazardous voltage interlock loop system, which system in particular can provide increased electrical safety as required for certain applications. For example in electric road applications, a vehicle may need to have at least two separate high voltage buses, and each high voltage bus may have its own hazardous voltage interlock loop.

According to a first aspect of the invention, the aforementioned object is achieved by a hazardous voltage interlock loop (HVIL) system, comprising: a first HVIL circuit (12) being associated with a first high voltage bus (52); a second HVIL circuit (14) being associated with a second high voltage bus (54), the first and second high voltage buses (52, 54) being separated and not electrically connected to each other, wherein the system further comprises a galvanically isolated relay (16) connected to the first and second HVIL circuits, wherein the galvanically isolated relay is configured to open the first HVIL circuit when no electrical current is flowing in at least a portion of the second HVIL circuit comprising the galvanically isolated relay.

The term "portion" as used herein may for example include a mesh.

The present invention is based on the understanding that such a relay can be used to robustly and instantaneously propagate a fault detected in one HVIL circuit to another HVIL circuit with maintained galvanic isolation between the circuits. This may enhance the electrical safety in a vehicle in which the system is installed.

The galvanically isolated relay for example may be an electromagnetic relay or a solid-state relay. The solid-state relay may comprise an optocoupler (also referred to an opto-isolator).

According to the present invention, the relay may here propagate a fault detected in the second HVIL circuit to the first HVIL circuit.

In one embodiment, the first HVIL circuit may include a (first) current loss detection device adapted to communicate a fault detected in the first HVIL circuit to the second HVIL circuit via a communication system. In this way, the second HVIL circuit can be opened or shut off if a fault is detected in the first HVIL circuit. A 'fault' could mean that a HVIL breaker switch on the HVIL circuit is opened. The communication system may for example be CAN (Controller Area Network). The communication system may include galvanic isolation.

According to other embodiments, the system may further comprise a second galvanically isolated relay connected to the first and second HVIL circuits. The second galvanically isolated relay may be configured to open the second HVIL circuit when no electrical current is flowing in at least a portion of the first HVIL circuit comprising the second galvanically isolated relay. In this way, also a fault detected in the first HVIL circuit can be propagated to the second HVIL circuit. The second galvanically isolated relay may be an electromagnetic relay or a solid-state relay (which may comprise an optocoupler), for example.

The first HVIL circuit may include a first electrical current source and a first current loss detection device, wherein a branch with a first diode is connected to a node between the relay and the second relay and to another node between the first current loss detection device and the first electrical current source. The branch with the first diode may be used during activation of the system.

The first current loss detection device may be adapted to communicate a fault detected in the first HVIL circuit to the first electrical current source for deactivation thereof via a first communication system, to ensure that the second relay opens the second HVIL circuit, despite the aforementioned first diode.

The second HVIL circuit may include a second electrical current source and a second current loss detection device, wherein a branch with a second diode is connected to a node between the relay and the second relay and to another node between the second current loss detection device and the second electrical current source, and wherein the second current loss detection device is adapted to communicate a fault detected in the second HVIL circuit to the second current source for deactivation thereof via a second communication system. In this way, it does not matter which HVIL circuit that is initiated first during activation of the system.

According to a second aspect of the invention, there is provided a vehicle comprising a hazardous voltage interlock loop system according to the first aspect.

The vehicle further comprises first and second separate high voltage busses, wherein the first HVIL circuit is associated with the first high voltage bus, and wherein the second HVIL circuit is associated with the second high voltage bus.

The vehicle may further comprise a pantograph for receiving energy from external overhead contact lines, and an electrical motor for propulsion of the vehicle, wherein each of the pantograph and the electrical motor is connected to any of the first and second separate high voltage buses.

According to a second aspect of the invention, there is provided a method of operating a hazardous voltage interlock loop system, which system comprises a first HVIL circuit (12) being associated with a first high voltage bus (52); a second HVIL circuit (14) being associated with a second high voltage bus (54); the first and second high voltage buses (52, 54) being separated and not electrically connected to each other, wherein the system further comprises a galvanically isolated relay (16) connected to the first and second HVIL circuits, wherein the galvanically isolated relay is configured to open the first HVIL circuit when no electrical current is flowing in at least a portion of the second HVIL circuit comprising the galvanically isolated relay, the method comprising the step(s) of: activating an electrical current source on the second HVIL circuit so that the relay closes at least a portion of the first HVIL circuit; and if a breaker relay on the second HVIL circuit is opened, the relay opening the first HVIL circuit. This aspect may exhibit the same or similar features and technical effects as the previous aspects, and vice versa.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
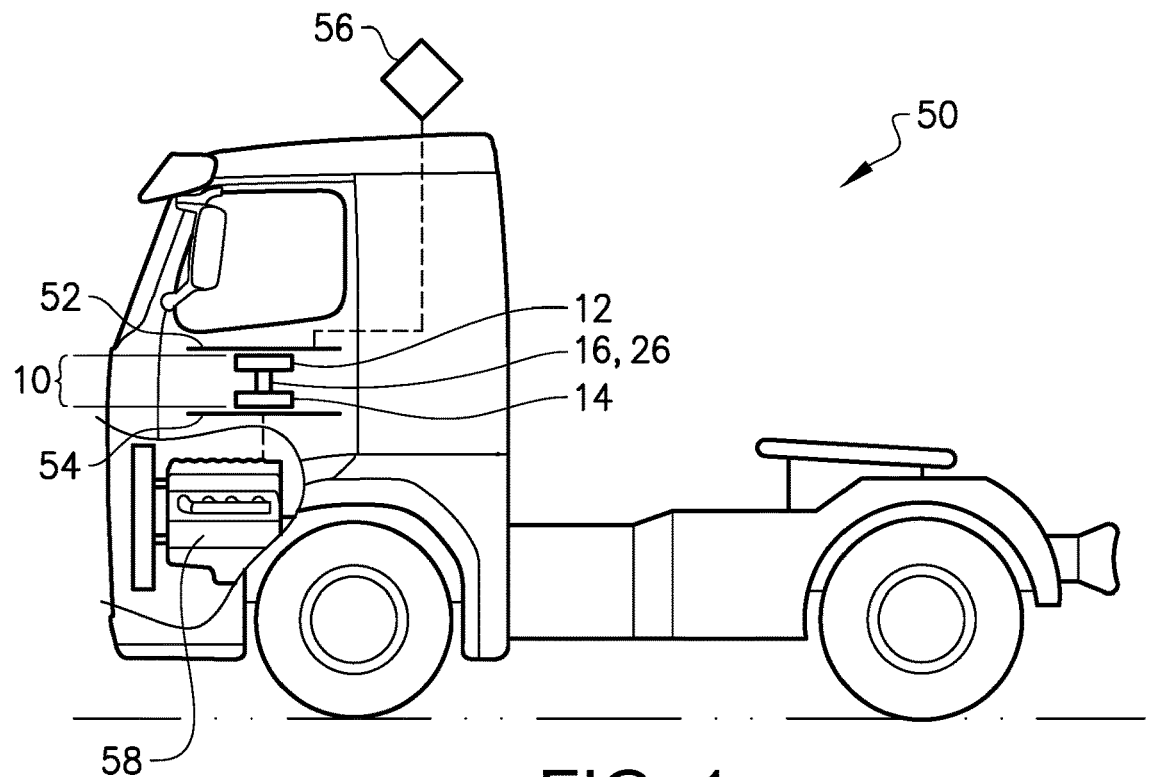
FIG. 1 is a schematic side view of a vehicle according to embodiments of the present invention.

FIG. 1 is a schematic side view of a vehicle 50 according to embodiments of the present invention. The vehicle 50 may for example be a truck. The vehicle 50 may be an electric vehicle or a hybrid vehicle, for example. The vehicle 50 may be used in electric road applications.

The vehicle 50 comprises first and second separate high voltage buses (HVB) 52, 54. The high voltage buses 52, 54 are separate in that they are not electrically connected to each other. The vehicle 50 may further comprise a pantograph 56 for receiving energy from external overhead contact lines (not shown). Instead of a pantograph, the vehicle 50 could include some other means for receiving energy, for example from electric tracks on the ground. The vehicle 50 further comprises an electrical motor 58 for propulsion of the vehicle 50. Each of the pantograph 56 and the electrical motor 58 is connected to any of the first and second high voltage buses 54, 54.

The vehicle 50 further comprises a hazardous voltage interlock loop (HVIL) system 10. The HVIL system comprises first and second HVIL circuits 12, 14. The first HVIL circuit 12 is associated with the first high voltage bus 52, and the second HVIL circuit 14 is associated with the second high voltage bus 54. This means that the first HVIL circuit 12 may detect faults related to loads on the first high voltage bus 52, whereas the second HVIL circuit 14 may detect faults related to loads on the second high voltage bus 54. The faults may for example be opening a lid, unplugging a connector, etc.

The HVIL system 10 further comprises at least one galvanically isolated relay 16, 26 interconnecting the first and second HVIL circuits 12, 14. By means of the at least one relay 16, 26, a detected fault can be propagated at least from one of the HVIL circuits to the other, despite that the HVIL circuits 12, 14 are electrically isolated from each other.

Figure 2:
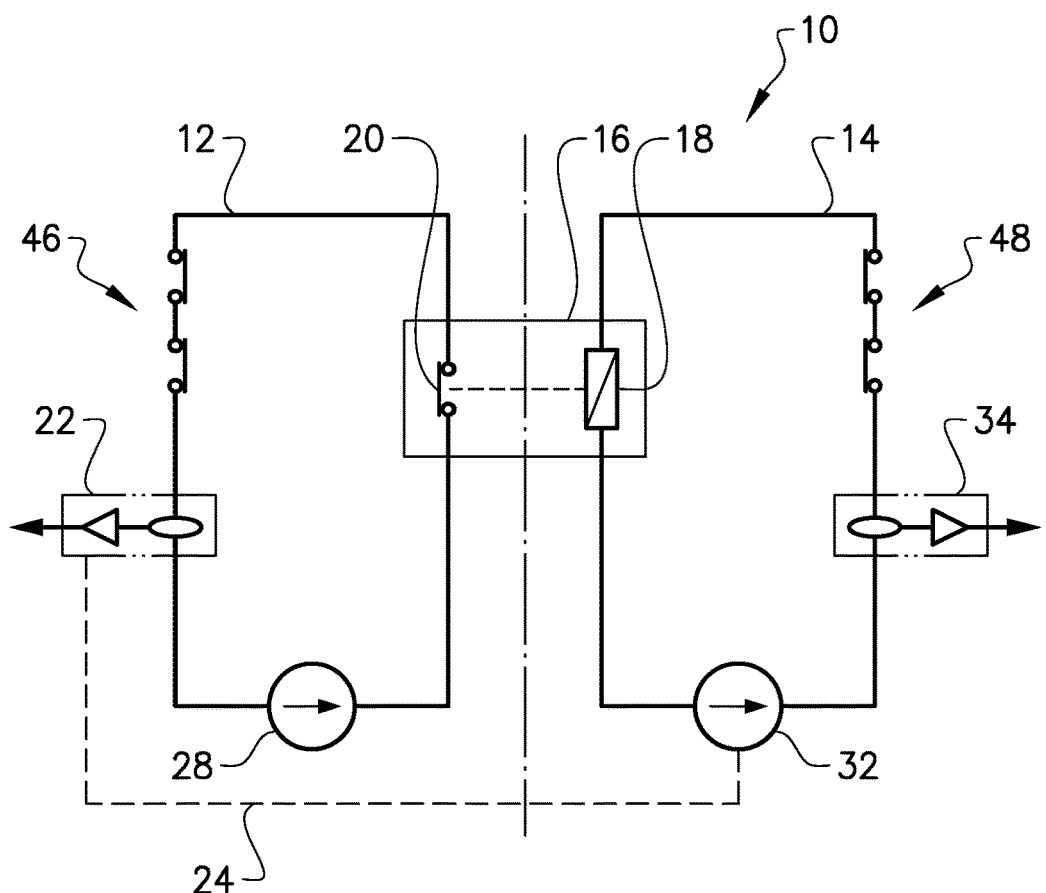
FIG. 2 illustrates an HVIL system according to a first embodiment of the present invention.

FIG. 2 illustrates a first embodiment of the HVIL system 10. The first embodiment may be denoted "single direction fault propagation". The HVIL system 10 in FIG. 2 comprises the first HVIL circuit 12, the second HVIL circuit 14, and one galvanically isolated relay 16. The (imaginary) isolation barrier between the first and second HVIL circuits 12, 14 is shown as a dash-dotted vertical line in FIG. 2.

The relay 16 shown in FIG. 2 is an electromagnetic relay, though it could alternatively be a solid-state relay with an optocoupler, for example. The relay 16 is connected to the first and second HVIL circuits 12, 14. Namely, the relay 16 comprises a controlling element in the form of a coil 18 on the second HVIL circuit 14, and a controlled element in the form of an armature 20 on the first HVIL circuit 12. The relay 16 is normally open (NO).

In counter-clockwise order (i.e. in the direction of current) starting from the armature 20 of the relay 16, the first HVIL circuit 12 further includes one or more first HVIL breaker switches 46, a first current loss detection device 22, and a first electrical current source 28. In counter-clockwise order (i.e. in the direction of current) starting from the coil 18 of the relay 16, the second HVIL circuit 14 further includes a second electrical current source 32, a second current loss detection device 34, and one or more second HVIL breaker switches 48. The first and second HVIL circuits 12, 14 may here be single loop circuits.

The relay 16 is generally configured to propagate a fault in the second HVIL circuit 14 to the first HVIL circuit 12, by opening the first HVIL circuit 12 when no current is flowing in the second HVIL circuit 14. The relay 16 is also configured to close the first HVIL circuit 12 when electrical current is flowing in the second HVIL circuit 14.

In operation, when the second electrical current source 32 is activated, the coil 18 of the relay 16 will be energized and therefore cause the first HVIL circuit 12 to become a closed circuit. The first electrical current source 28 is then activated, and the result is current flowing in both HVIL circuits 12, 14.

When any event causes the electrical current in the second HVIL circuit 14 to stop flowing (for example if one of the one or more second HVIL breaker switches 48 is opened), the coil 18 of the relay 16 ceases to be energized and hence opens the first HVIL circuit 12. This is detected by the current detecting device 22, 34 in both the second HVIL circuit 14 and the first HVIL circuit 12.

When an event causes the electrical current in the first HVIL circuit 12 to stop flowing, this is communicated from the first loss detection device 22 to the second HVIL circuit 14 using a communication system 24, for example CAN. The first loss detection device 22 may for example instruct the second electrical current source 32 to shut off.

The detection of an HVIL event (fault) is typically faster in the first of the two cases.

Figure 3:
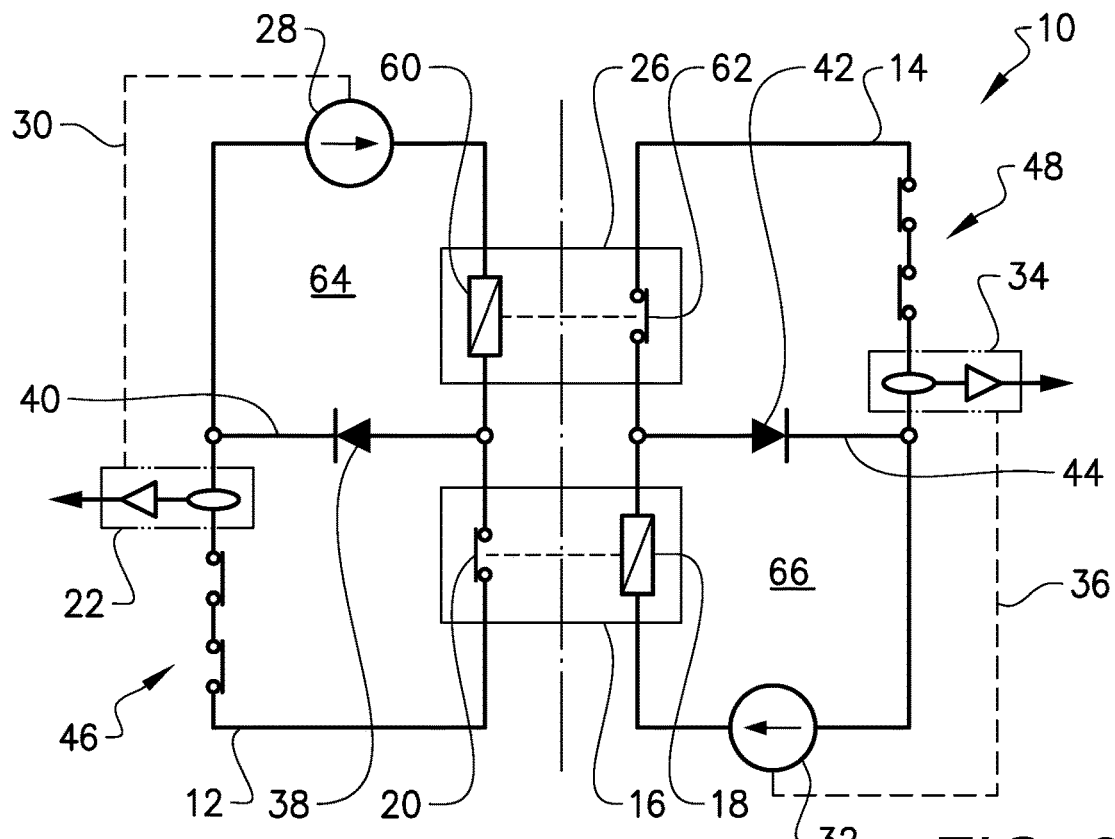
FIG. 3 illustrates an HVIL system according to a first variant of a second embodiment of the present invention.

FIG. 3 illustrates a first variant of a second embodiment of the HVIL system 10. The second embodiment may be denoted "bidirectional fault propagation", and the first variant thereof may in particular be denoted "symmetrical bidirectional fault propagation". The HVIL system 10 in FIG. 3 comprises the first HVIL circuit 12, the second HVIL circuit 14, and two galvanically isolated relays 16, 26. The (imaginary) isolation barrier between the first and second HVIL circuits 12, 14 is shown as a dash-dotted vertical line in FIG. 3.

The relays 16, 26 shown in FIG. 3 are electromagnetic relays, though they could alternatively be solid-state relays each with an optocoupler, for example. Each relay 16, 26 is connected to the first and second HVIL circuits 12, 14. Namely, the first relay 16 comprises a controlling element in the form of a first coil 18 on the second HVIL circuit 14, and a controlled element in the form of a first armature 20 on the first HVIL circuit 12. The second relay 26 comprises a controlling element in the form of a second coil 60 on the first HVIL circuit 12, and a controlled element in the form of a second armature 62 on the second HVIL circuit 14.

In clockwise order (i.e. in the direction of current), the first HVIL circuit 12 includes a first electrical current source 28, the coil 60 of the second relay 26, the armature 20 of the first relay 16, one or more first HVIL breaker switches 46, and a first current loss detection device 22. A branch 40 with a first diode 38 is connected to a node of the first HVIL circuit 12 between the first relay 16 and the second relay 26 and to another node of the first HVIL circuit 12 between the first current loss detection device 22 and the first electrical current source 28, whereby the first electrical current source 28, the coil 60 of the second relay 26, and the first diode 38 form a first "sub-loop" or mesh 64. In clockwise order (i.e. in the direction of current), the second HVIL circuit 14 includes a second electrical current source 32, the coil 18 of the first relay 16, the armature 60 of the second relay 26, one or more second HVIL breaker switches 48, and a second current loss detection device 34. A branch 44 with a second diode 42 is connected to a node of the second HVIL circuit 14 between the first relay 16 and the second relay 26 and to another node of the second HVIL circuit 14 between the second current loss detection device 34 and the second electrical current source 32, whereby the second electrical current source 32, the coil 18 of the first relay 16, and the second diode 42 form a second "sub-loop" or mesh 66.

The first relay 16 is generally configured to propagate a fault in the second HVIL circuit 14 to the first HVIL circuit 12, by opening the first HVIL circuit 12 when no current is flowing in (the second mesh 66 of) the second HVIL circuit 14. Likewise, the second relay 26 is generally configured to propagate a fault in the first HVIL circuit 12 to the second HVIL circuit 14, by opening the second HVIL circuit 14 when no current is flowing in (the first mesh 64 of) the first HVIL circuit 12.

In operation, before starting any of the first or second electrical current sources 28, 32, both relays 16, 26 are un-energized and therefore neither of the first and second circuits 12, 14 is closed. When one of the first and second electrical current sources 28, 32 is started, for example the first electrical current source 28, the current will initially flow through the first diode 38 in its branch 40 and therefore cause the related second coil 60 to be energized so closing the second HVIL circuit 14. The system 10 is now in a steady state where activation of the other (second) electrical current source 32 is expected. When activated, the current flows through the coil 18 of the first relay 16 and the armature 62 of the energized second relay 26, thereby concludes the activation of the second HVIL circuit 14. Since that causes the first relay 16 to activate, both HVIL circuits 12, 14 are then fully active. Only a negligible amount of current now flows through the diodes 38, 42.

When an event occurs in either of the HVIL circuits 12, 14, the corresponding current source 28, 32 is deactivated, otherwise current would again flow through the diode 38, 42. To this end, the first current loss detection device 22 is adapted to communicate a fault detected in the first HVIL circuit 12 to the first current source 28 for deactivation thereof via a first communication system 30. Likewise, the second current loss detection device 34 is adapted to communicate a fault detected in the second HVIL circuit 14 to the second current source 32 for deactivation thereof via a second communication system 36. The first and second communications systems 30, 36 may for example be CAN. The first and second communications systems 30, 36 may include galvanic isolation.

If for example an event (fault) occurs in the first HVIL circuit 12, this is detected by the first current loss detection device 22, which in turn communicates the fault to the first current source 28 for deactivation thereof. When the first current source 28 is deactivated or shut off, no electrical current is flowing in the first mesh 64, and the coil 60 of the second relay 26 ceases to be energized and hence opens the second HVIL circuit 14. Likewise, when an event (fault) occurs in the second HVIL circuit 14, this is detected by the second current loss detection 34, which in turn communicates the fault to the second current source 32 for deactivation thereof. When the second current source 32 is deactivated or shut off, no electrical current is flowing in the second mesh 66, and the coil 18 of the first relay 26 ceases to be energized and hence opens the first HVIL circuit 12.

Figure 4:
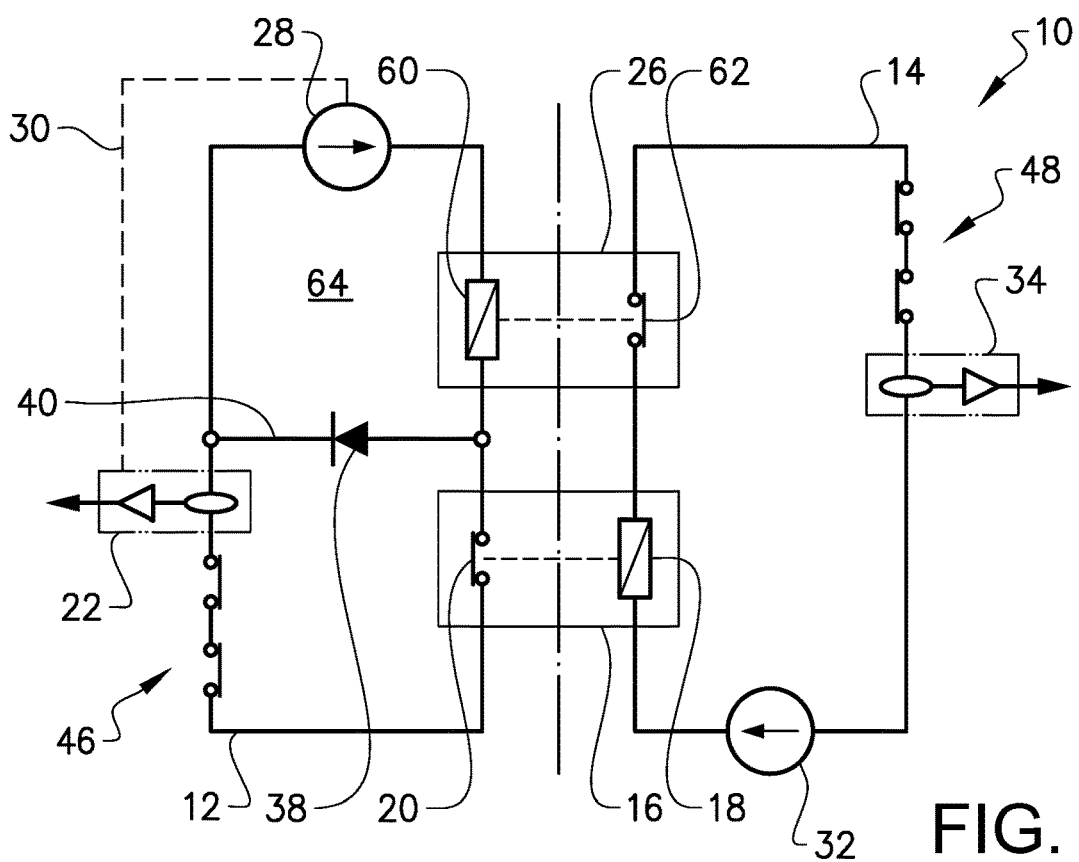
FIG. 4 illustrates an HVIL system according to a second variant of the second embodiment of the present invention.

FIG. 4 illustrates a second variant of the second embodiment of the HVIL system 10. The second variant may be denoted "asymmetrical bidirectional fault propagation". The second variant is similar to the first variant (FIG. 3), except that the second diode 42 and the second branch 44 are omitted. Also, the second current loss detection device 34 does not have to be adapted to communicate a fault detected in the second HVIL circuit 14 to the second current source 32 for deactivation thereof via a second communication system. In the second variant shown in FIG. 4, the first electrical current source 28 must be started first. Also, if a fault is detected in the second HVIL circuit 14, this fault is automatically propagated to the first HVIL circuit 12, without having to first communicate it from the second current loss detection device 34 to the second current source 32 for deactivation thereof. Otherwise the system 10 of the second variant operates similar to that of the first variant.

It is to be understood that the present invention is not limited to the embodiments described above and illustrated in the drawings; rather, the skilled person will recognize that many changes and modifications may be made within the scope of the appended claims.

The invention claimed is:
1. A hazardous voltage interlock loop, HVIL, system, comprising:

a first HVIL circuit;
a second HVIL circuit;
characterized in that
the first HVIL circuit being associated with a first high voltage bus;
the second HVIL circuit being associated with a second high voltage bus;
the first and second high voltage buses being separated and not electrically connected to each other, wherein the system further comprises
a galvanically isolated relay connected to the first and second HVIL circuits, wherein the galvanically isolated relay is configured to open the first HVIL circuit when no electrical current is flowing in at least a portion of the second HVIL circuit comprising the galvanically isolated relay.

2. A system according to claim 1, wherein the galvanically isolated relay is an electromagnetic relay or a solid-state relay.

3. A system according to claim 1, wherein the first HVIL circuit includes a current loss detection device adapted to communicate a fault detected in the first HVIL circuit to the second HVIL circuit via a communication system.

4. A system according to claim 1, further comprising a second galvanically isolated relay connected to the first and second HVIL circuits and configured to open the second HVIL circuit when no electrical current is flowing in at least a portion of the first HVIL circuit comprising the second galvanically isolated relay.

5. A system according to claim 4, wherein the first HVIL circuit includes a first electrical current source and a first current loss detection device, and wherein a branch with a first diode is connected to a node between the relay and the second relay and to another node between the first current loss detection device and the first electrical current source.

6. A system according to claim 5, wherein the first current loss detection device is adapted to communicate a fault detected in the first HVIL circuit to the first electrical current source for deactivation thereof via a first communication system.

7. A system according to claim 6, wherein the second HVIL circuit includes a second electrical current source and a second current loss detection device, wherein a branch with a second diode is connected to a node between the relay and the second relay and to another node between the second current loss detection device and the second electrical current source, and wherein the second current loss detection device is adapted to communicate a fault detected in the second HVIL circuit to the second current source for deactivation thereof via a second communication system.

8. A vehicle comprising a hazardous voltage interlock loop system according to claim 1.

9. A vehicle according to claim 8, further comprising a pantograph for receiving energy from external overhead contact lines, and an electrical motor for propulsion of the vehicle, wherein each of the pantograph and the electrical motor is connected to any of the first and second separate high voltage buses.

10. A method of operating a hazardous voltage interlock loop, HVIL, system, which system comprises a first HVIL circuit associated with a first high voltage bus, a second HVIL circuit associated with a second high voltage bus, the first and second high voltage buses being separated and not electrically connected to each other, and the system further comprises a galvanically isolated relay connected to the first and second HVIL circuits, characterized by the step(s) of:
    activating an electrical current source on the second HVIL circuit so that the relay closes at least a portion of the first HVIL circuit; and
    if a breaker switch on the second HVIL circuit is opened, the relay opening the first HVIL circuit.

* * * * *